(12) United States Patent
Cohen et al.

(10) Patent No.: US 8,856,223 B2
(45) Date of Patent: Oct. 7, 2014

(54) LIMITING ACCESS TO INSTANT MESSAGING CONTENT ON A DISPLAY SCREEN

(75) Inventors: Gabriel Aaron Cohen, Raleigh, NC (US); Ronald Eugene Craig, Pittsboro, NC (US); Gerald Laverte Mitchell, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2431 days.

(21) Appl. No.: 11/038,323

(22) Filed: Jan. 18, 2005

(65) Prior Publication Data

US 2006/0161629 A1      Jul. 20, 2006

(51) Int. Cl.
*G06F 15/16*      (2006.01)
*G06F 21/84*      (2013.01)
*H04L 12/58*      (2006.01)

(52) U.S. Cl.
CPC ............ *H04L 12/581* (2013.01); *G06F 21/84* (2013.01); *H04L 51/04* (2013.01)
USPC ........................... 709/204; 709/206; 709/229

(58) Field of Classification Search
USPC ........................................ 709/204, 206, 226
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,301,609 B1 | 10/2001 | Aravamudan et al. | 709/207 |
| 6,430,602 B1 | 8/2002 | Kay et al. | 709/206 |
| 6,510,458 B1 | 1/2003 | Berstis et al. | 709/219 |
| 2003/0041092 A1 | 2/2003 | Woo | 709/200 |
| 2003/0107584 A1 * | 6/2003 | Clapper | 345/619 |
| 2003/0229722 A1 * | 12/2003 | Beyda | 709/310 |
| 2004/0078441 A1 | 4/2004 | Malik et al. | 709/206 |
| 2004/0078596 A1 | 4/2004 | Kent, Jr. et al. | 713/201 |
| 2005/0138109 A1 * | 6/2005 | Redlich et al. | 709/201 |
| 2006/0036739 A1 * | 2/2006 | Hagale et al. | 709/227 |

(Continued)

FOREIGN PATENT DOCUMENTS

| | | | | |
|---|---|---|---|---|
| WO | WO 02/065250 | 8/2002 | | |
| WO | WO 03/105009 | 12/2003 | ............. | G06F 15/16 |

OTHER PUBLICATIONS

U.S. Appl. No. 10/735,9651, Karstens, Methods and Systems of Instant Message Secure Client Control, filed Dec. 15, 2003.
U.S. Appl. No. 10/411,468, Hamilton et al., User Control of Off-Line Messaging, filed Apr. 10, 2003.

(Continued)

*Primary Examiner* — Dhairya A Patel
*Assistant Examiner* — Alan S Chou
(74) *Attorney, Agent, or Firm* — Steven M. Greenberg, Esq.; CRGO Law

(57) ABSTRACT

A technique that reduces the possibility that a message received at a computer terminal during an instant messaging conversation will become accessible to unintended viewers. One embodiment is directed to an arrangement wherein a computer terminal at a first client work station is disposed to receive chat messages from a second client work station during an instant messaging conversation. An apparatus associated with the computer terminal for limiting access to the received chat messages includes a device for attaching a security identifier to each received chat message. A display device at the computer terminal generates a window that selectively provides a specified one of the chat messages in viewable form. A concealment device coupled to the display device is operable to make the specified chat message unviewable on the display device. A component connected to the concealment device activates the concealment device when a prespecified event occurs.

21 Claims, 3 Drawing Sheets

(56) References Cited

U.S. PATENT DOCUMENTS

2006/0036740 A1* 2/2006 Hagale et al. ................ 709/227
2006/0245559 A1* 11/2006 Hodge et al. ............... 379/88.19
2007/0070213 A1* 3/2007 Tedesco et al. ............ 348/222.1

OTHER PUBLICATIONS

Cohen et al., Apparatus and Method for Controlling Use of Instant Messaging Content, Jan. 18, 2005.
Cohen et al., Apparatus and Method for Controlling Use of Individual Segments of Instant Messaging Content, Jan. 18, 2005.

* cited by examiner

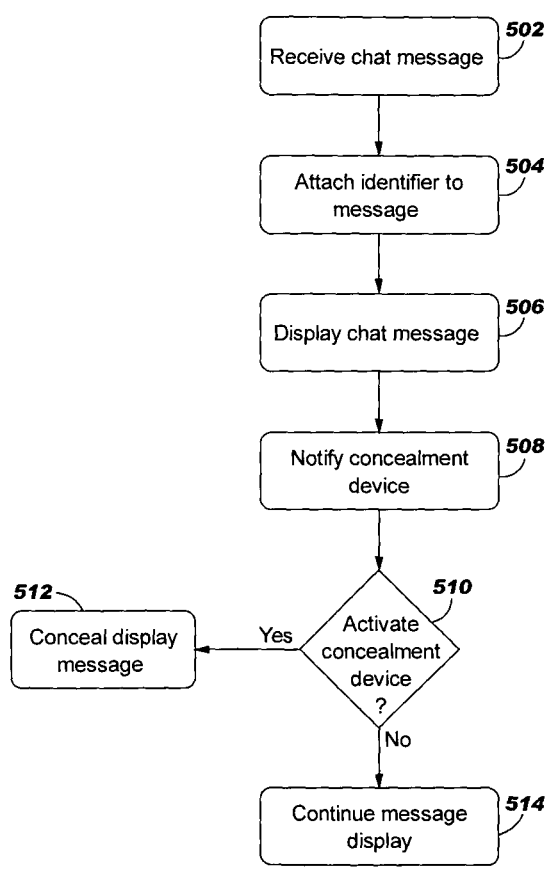

LIMITING ACCESS TO INSTANT MESSAGING CONTENT ON A DISPLAY SCREEN

CROSS-REFERENCE TO RELATED APPLICATIONS

This application is related to commonly assigned U.S. patent application Ser. No. 11/039,727, filed on Jan. 18, 2005, now abandoned, entitled "Apparatus and Method for Controlling Use of Instant Messaging Content"; and U.S. patent application Ser. No. 11/039,776, filed on Jan. 18, 2005, now U.S. Pat. No. 7,689,653, entitled "Apparatus and Method for Controlling Use of Individual Segments of Instant Messaging Content".

BACKGROUND OF THE INVENTION

1. Technical Field

The invention disclosed and claimed herein generally pertains to an apparatus and method for preventing unintended access to information content received during instant messaging conversations. More particularly, the invention pertains to apparatus of the above type wherein respective participants are located at client work stations that are remotely located from one another. Even more particularly, the invention pertains to apparatus of the above type wherein instant messaging content received at a client work station is set up for display on a computer terminal located at the client work station.

2. Description of Related Art

Businesses increasingly are relying on a diverse set of electronic communication tools in the work place. Accordingly, security measures that have been in place for some time on more traditional forms of business communications, such as letters, should now be applied to the increasingly broad spectrum of electronic business communications. This is necessary to control propagation and prevent unintended dissemination of sensitive business information.

Previously, efforts made to prevent proliferation of information in the new electronic mediums for communication have generally been directed to email. One solution in the email space is to attach a flag to an email which prevents the forwarding of the email. This flag can also prevent clipboard copying of the text. However, in the case of email this can be easily thwarted, such as by taking pictures of the screen or using a non-compliant email system.

Another important type of electronic communication is known by those of skill in the art as instant messaging, or chat. In an instant messaging or chat conversation, two or more participants operate client work stations that are remotely located from one another, but are also interconnected to enable bidirectional communication by all participants. Thus, one participant can send a message to another, and immediately receive back a response or reply. The instant messaging configuration enables participants located at different places to discuss a topic, or to discuss multiple topics. Moreover, the configuration can remain in place over time, so that the participants can exchange messages during a period extending over days or longer.

It will be readily apparent that a great deal of important and valuable information content can be generated and exchanged in the course of an instant messaging or chat conversation or event. Thus, as this communication medium is increasingly used in the work place, it becomes necessary to enforce controls on the use that is made of content generated through this medium. In the past, improper use of this medium and content produced thereby has resulted in misunderstandings, dissemination of private information and disclosure of sensitive business data.

Currently, transcripts can be saved and forwarded, and text can be clipped and copied. Often out of context, chat content may be sent along through an unpredictable chain to the wrong parties. Also, certain solutions available in the email space generally do not apply in the realm of instant messaging. Unlike email, content in the medium of instant messaging is not discrete, in the sense that it is not neatly divided into individual notes which can be identified by subject and marked as sensitive. Thus, it is necessary to control the information contained within a chat transcript more granularly, even line by line.

Moreover, since chat content is often non-topical in nature, a chat configuration involving two or more participants can remain open for days at a time, and can cover a variety of unrelated subjects. During this entire period segments or portions of chat content could be received by one of the instant messaging participants, and appear on the display screen of his/her computer terminal. If others had casual access to the computer terminal during this period, they could inadvertently view chat material they were not intended to see. It would be very desirable to provide a simplified arrangement to prevent or minimize this type of unintended access to instant messaging content.

BRIEF SUMMARY OF THE INVENTION

The invention generally provides an apparatus and method for substantially reducing the possibility that chat content, received at a computer terminal during an instant messaging conversation, will be disclosed or made accessible to unintended viewers. One useful embodiment of the invention is directed to an arrangement wherein a computer terminal at a first client work station is disposed to receive chat messages from a second client work station during an instant messaging conversation. Apparatus associated with the computer terminal, for limiting access to the received chat messages, comprises a device for attaching a selected identifier to each of the chat messages received by the computer terminal. The apparatus further comprises a display device at the computer terminal for generating a window that selectively provides a specified one of the chat messages in viewable form. A concealment device coupled to the display device and responsive to the identifiers is operable to cause the specified chat message provided by the window to become unviewable. The apparatus further includes a component for selectively activating the concealment device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flow chart further illustrating an embodiment of the invention.

DETAILED DESCRIPTION OF THE INVENTION

Figure 1:
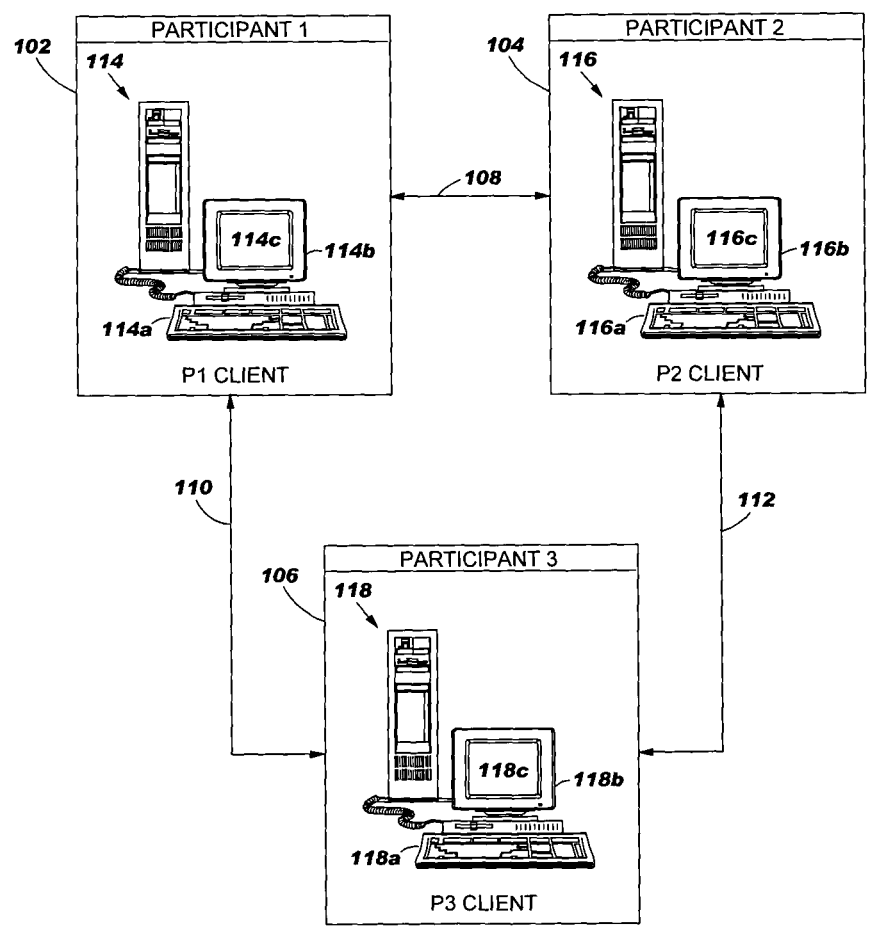
FIG. 1 is a schematic diagram showing a configuration of client work stations, wherein at least one of the work stations is configured to implement an embodiment of the invention.

Referring to FIG. 1, there is shown a configuration of clients or client work stations 102-106, wherein each client is connected to every other client by means of bidirectional communication links or paths 108-112. As used herein, the terms "client" and "client work station" refer to or include a computer or other data processing work station operable by a user to communicate with other computer work stations, over a network or other communication path. Communication paths 108-112 may compromise, for example, segments of the Internet, wireless communication links, or electro-optical communication paths, such as fiber optic cables. Thus, Participants 1-3, shown by FIG. 1 to be located at clients 102-106 respectively, may operate their respective client work stations to exchange information with one another. More particularly, Participants 1-3 of clients 102-106 are disposed to engage in instant messaging or chat communication with one another, as described above. Access to and propagation of the chat information content disclosed among the instant messaging participants is intended to be controlled or regulated in accordance with embodiments of the invention, as described herein.

FIG. 1 further shows computer terminals 114-118 respectively located at client work stations 102-106, to be operated by Participants 1-3 for instant messaging. Computer terminals 114-118 are respectively provided with keyboards 114a-118a and monitors or display devices 114b-118b. The display devices 114b-118b respectively include display screens 114c-118c.

Figure 2:
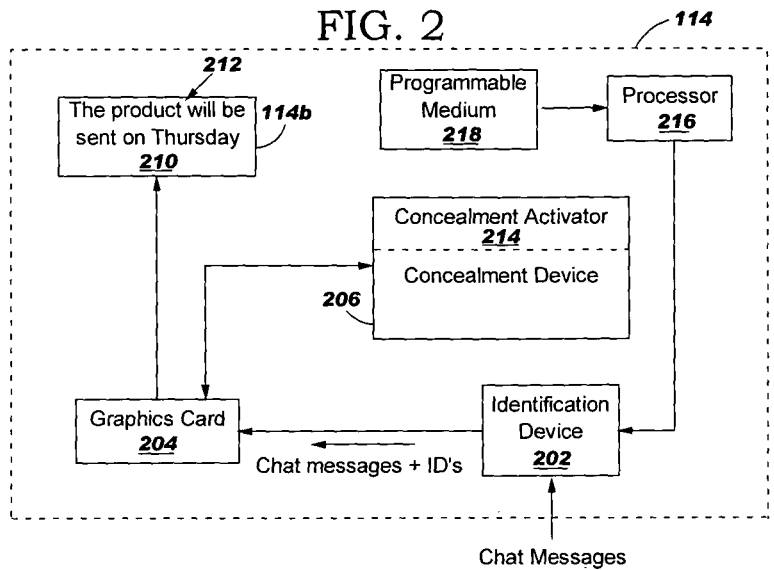
FIG. 2 is a block diagram showing components associated with one of the client work stations of FIG. 1 for implementing an embodiment of the invention.

Referring to FIG. 2, there is shown computer terminal 114 receiving chat messages sent to client 102 from clients 104 and 106, during an instant messaging conversation. Received chat messages are coupled to a chat message identification device 202, which operates to attach or apply security identifiers to respective chat messages. Each identifier thus indicates that its associated message was sent to client 102 by another client during the instant messaging exchange. The identifier could comprise, for example, a bit set to 1 rather than to 0, or could comprise a flag.

Referring further to FIG. 2, there is shown computer terminal 114 provided with a graphics card 204, coupled to receive the chat messages from identification device 202, each with its attached identifier. Graphics card 204 is also coupled to the display device 114b, and operates in a conventional manner to drive display device 114b to display windows containing text messages and other graphic images. In addition, graphics card 204 is adapted to recognize that an identifier is attached to a received chat message. In response to a received identifier, the graphics card 204 notifies a concealment device 206, by means of bidirectional link 208, that a window being displayed by display device 114b contains a chat message. This notification enables concealment device 206 to limit viewable access to the displayed chat message, as described hereinafter.

Figure 3:
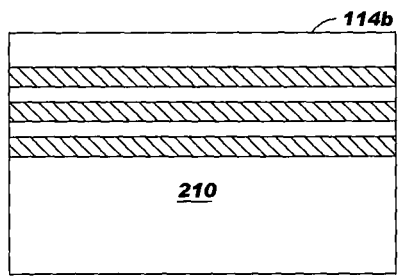
FIG. 3 depicts a displayed chat message concealed from view in accordance with an embodiment of the invention.

FIG. 2 shows a window 210 containing text of a chat message 212 displayed by device 114b, and also shows concealment device 206 provided with an activation component 214. When device 206 is notified that a chat message is being displayed on device 114b, component 214 activates device 206 to conceal the message, upon the occurrence of a pre-specified event. In one embodiment, the concealment device 206, upon becoming activated, drives graphics card 204 to "fuzz out" the contents of window 210. That is, the displayed window 210 is selectively distorted, to make the text of the chat message contained thereon unintelligible or unviewable. For example, the display screen 114c of device 114b could be made to appear as shown in FIG. 3. This operation of the display device would significantly reduce the possibility that a chat message on the display screen would be seen by an unintended viewer.

In one mode of operation, activation component 214 would sense when window 210 was no longer in focus, that is, was no longer the foreground or "on top" window presented by display device 114b. Upon detecting this event, component 214 would activate device 206 to conceal the message contained by window 210.

In another mode of operation, activation component 214 would monitor the passage of time, whenever the chat message window 210 was being displayed as the foreground window on display device 114b. After a prespecified time period, with no activity affecting the displayed foreground window 210, component 214 would activate device 206 to conceal the chat message of window 210, as described above.

FIG. 2 further shows a programmable or computer readable medium 218, and a processor 216 connected thereto. Programmable medium 218 comprises any suitable medium for storage of software instructions, such as a hard disk, a floppy disk, a RAM, a CD-ROM, or a DVD-ROM. Processor 216 is also connected to concealment device 206, identification device 202 and graphics card 204. The medium 218 contains software instructions for operating each of these devices to perform their respective tasks, as described herein.

Figure 4:
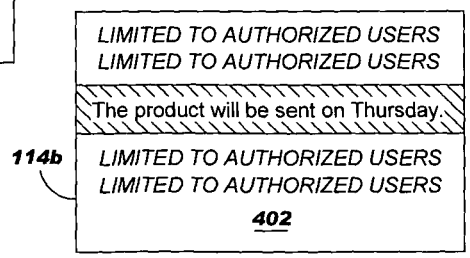
FIG. 4 depicts a watermark applied to a window displaying a chat message in accordance with an embodiment of the invention.

In a further embodiment of the invention, identification device 202 is operated to convert the format of incoming chat message data to a watermarked image format. Accordingly, if an image of a chat message is displayed or printed, the image will include other markings as well. For example, FIG. 4 shows a chat message window 402 displayed by device 114b, wherein the window includes a watermark providing notice that access to the chat message should be limited to authorized users. Converting chat messages to the watermarked format tends to prevent others from editing or cropping either the messages, or the entire transcript of the instant messaging conversation.

Referring to FIG. 5, there is shown a flow chart further illustrating an embodiment of the invention. Function block 502 shows client 102 or the like receiving a chat message from other clients, and function block 504 shows attachment of security identifiers to respective received chat messages. After attachment of an identifier, a chat message is displayed, and the concealment device is notified that the currently displayed message is a chat message. These tasks are shown by function blocks 506 and 508, respectively. When an activation event occurs, such as described above, the concealment device 206 is operated to conceal the displayed chat message, or render it unviewable. This is indicated by decision block 510 and by function block 512. The chat message continues to be displayed when concealment device 206 is not activated, as shown by function block 514.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In an arrangement wherein a computer terminal at a first client work station receives chat messages from a second client work station during an instant messaging conversation, a method for limiting access to a received chat message at the computer terminal, said method comprising:
    recognizing an identifier attached to a chat message being transmitted to a display screen of the computer terminal, the identifier is a security indicator indicating that security is required for the chat message;
    responsive to the recognition of the security indicator on the chat message, notifying a device that security is required for the chat message;
    detecting a predefined triggering event; and
    responsive to the detection of the predefined triggering event, the device concealing the chat message on the display screen.

2. The method of claim 1, wherein
    the device distorts the chat message on the display screen.

3. The method of claim 1, wherein the detecting further comprises
    generating a window in a foreground of the display screen that contains the chat message; and
    sensing when the generated window changes from being displayed in the foreground of the display screen.

4. The method of claim 1, wherein
    the chat message is selectively concealed.

5. The method of claim 1, wherein
    the attached identifier indicates that the chat message was sent to the first client work station from the second client work station during the instant messaging conversation.

6. The method of claim 1, further comprising:
    converting a format of the chat message being transmitted to the display screen to include a watermark image.

7. The method of claim 6, wherein
    the watermark image comprises information that indicates, in the chat message, that access is limited to authorized users.

8. In an arrangement wherein a computer terminal at a first client work station receives chat messages from a second client work station during an instant messaging conversation, an apparatus connected to the computer terminal for limiting access to a received chat message, said apparatus comprising:
    a recognition device for recognizing an identifier attached to a chat message being transmitted to a display screen of the computer terminal, the identifier is a security indicator indicating that security is required for the chat message;
    a concealment device configured to conceal the chat message on the displaying screen; and
    a detection device for detecting a predefined triggering event, wherein
    the recognition device, responsive to recognizing the security indicator on the chat message, configured to notify the concealment device that security is required for the chat message, and
    the concealment device, responsive to the detection of the predefined triggering event, concealing the chat message on the display screen.

9. The apparatus of claim 8, wherein:
    the device distorts the chat message on the display screen.

10. The apparatus of claim 8, wherein the detection device:
    generates a window in a foreground of the display screen that contains the chat message; and
    senses when the generated window changes from being displayed in the foreground of the display screen.

11. The apparatus of claim 8, wherein:
    the chat message is selectively concealed.

12. The apparatus of claim 8, wherein:
    the attached identifier indicates that the chat message was sent to the first client work station from the second client work station during the instant messaging conversation.

13. The apparatus of claim 8, wherein:
    the received chat messages is converted to include a watermarked image.

14. The apparatus of claim 13, wherein:
    the watermark image comprises information that indicates, in the chat message, that access is limited to authorized users.

15. In an arrangement wherein a computer terminal at a first client work station is disposed receives chat messages from a second client work station during an instant messaging conversation, a computer program product stored in a computer readable tangible device having stored thereon a routine set of instructions for causing the computer terminal to perform the steps of:
    recognizing an identifier attached to a chat message being transmitted to a display screen of the computer terminal, the identifier is a security indicator indicating that security is required for the chat message;
    responsive to the recognition of the security indicator on the chat message, notifying a device that security is required for the chat message;
    detecting a predefined triggering event; and
    responsive to the detection of the predefined triggering event, the device concealing the chat message on the display screen.

16. The computer program product of claim 15, wherein
    the device distorts the chat message on the display screen.

17. The computer program product of claim 15, wherein the detecting further comprises
    generating a window in a foreground of the display screen that contains the chat message; and
    sensing when the generated window changes from being displayed in the foreground of the display screen.

18. The computer program product of claim 15, wherein
    the chat message is selectively concealed.

19. The computer program product of claim 15, wherein
    the attached identifier indicates that the chat message was sent to the first client work station from the second client work station during the instant messaging conversation.

20. The computer program product of claim 15, further comprising:
   converting a format of the chat message being transmitted to the display screen to include a watermark image.

21. The computer program product of claim 20, wherein the watermark image comprises information that indicates, in the chat message, that access is limited to authorized users.

\* \* \* \* \*